US000001271H

United States Statutory Invention Registration [19]

[11] Reg. Number: H1271

Shouse

[43] Published: Jan. 4, 1994

[54] CIGARETTE

[75] Inventor: George A. Shouse, Winston-Salem, N.C.

[73] Assignee: R. J. Reynolds Tobacco Co., Winston-Salem, N.C.

[21] Appl. No.: 734,369

[22] Filed: Jul. 22, 1991

[51] Int. Cl.[5] ..... A24B 1/00; A24C 1/18

[52] U.S. Cl. ..... 131/86; 131/360

[58] Field of Search ..... 131/360, 86, 85, 70

[56] References Cited

U.S. PATENT DOCUMENTS

| | | | |
|---|---|---|---|
| Re. 32,615 | 3/1988 | Luke | 131/360 |
| 197,620 | 11/1877 | Brull | 131/86 |
| 356,244 | 1/1987 | Emery . | |
| 1,725,869 | 8/1929 | Kornsweet . | |
| 1,865,943 | 7/1932 | Miller | 131/360 |
| 3,695,422 | 10/1972 | Tripodi . | |
| 3,858,788 | 1/1975 | Phillips, Jr. . | |
| 3,874,581 | 4/1975 | Fox et al. . | |
| 3,944,066 | 3/1976 | Niepmann . | |
| 4,114,777 | 9/1978 | Frohling et al. . | |
| 4,535,790 | 8/1985 | Wheless . | |
| 4,638,818 | 1/1987 | Nichols et al. . | |
| 4,727,888 | 3/1988 | Luke . | |
| 4,753,383 | 6/1988 | Focks et al. . | |
| 4,852,734 | 8/1989 | Allen et al. . | |

FOREIGN PATENT DOCUMENTS

| | | | |
|---|---|---|---|
| 1235039 | 4/1988 | Canada . | |
| 0333476 | 2/1921 | Fed. Rep. of Germany | 131/360 |
| 0887620 | 8/1953 | Fed. Rep. of Germany | 131/86 |
| 0195648 | 2/1938 | Switzerland | 131/86 |
| 0016488 | of 1893 | United Kingdom | 131/85 |

*Primary Examiner*—David H. Brown

*Attorney, Agent, or Firm*—Bell, Seltzer, Park & Gibson

[57] ABSTRACT

The present invention relates to a plurality of manufactured cigarettes adapted to be arranged in a packaged configuration thereof. Each of the cigarettes include a rod of smokable material contained in a circumscribing paper wrapper (i.e., a "smokable rod"). Each of the smokable rods have a plurality of substantially flat sides and have at least one crease longitudinally extending substantially along the total length thereof. Preferably, each of the smokable rods includes a pair of creases longitudinally extending substantially along the length thereof to define one of the flat sides. The present invention also relates to a method of manufacturing cigarettes adapted to be arranged in a packaged configuration. The method includes providing a plurality of cigarettes including a smokable rod having a substantially circular or oval cross-section, and applying a compressive pressure to the smokable rods to provide a plurality of flat sides and at least one crease in the smokable rod.

22 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CIGARETTE

BACKGROUND OF THE INVENTION

The present invention relates to cigarettes, and more particularly to cigarettes so shaped to provide advantageous aesthetic and consumer perception characteristics.

Popular smoking articles, such as cigarettes, have a substantially cylindrical rod shaped structure, have no flat sides, and typically have a circular cross-section or an oval cross-section (see U.S. Pat. No. 4,638,818 to Nichols et al). Cigarettes include a charge of smokable material, such as shredded tobacco (e.g., cut filler), surrounded by a paper wrapper thereby forming a so-called "smokable rod." It has become desirable to manufacture cigarettes having substantially cylindrical filter elements aligned in an end-to-end relationship with the smokable rod. Typically, filter elements are manufactured from fibrous materials such as cellulose acetate and plug wrap, and are attached to the smokable rod using a circumscribing tipping material. It also has become desirable to perforate the tipping material and plug wrap, in order to provide for dilution of drawn mainstream smoke with ambient air.

These smoking articles conventionally have been adapted to be arranged in a packaged configuration (i.e., a "package"). Typically, each package contains about 20 cigarettes. One type of popular cigarette package is the so-called "hard pack," "crush proof box" or "hinged lid package." Such a package has a generally cuboid-type shape, is manufactured from resilient paperboard and includes an outer wrap of transparent polypropylene film. Another type of cigarette package is the so-called "soft-pack" manufactured from a less resilient paperboard.

Hinged lid cigarette packages conventionally are made from two paperboard blanks. One blank forms the body and lid of the package. The second blank forms an insert or inner frame which is assembled to the inside of the front and side walls of the package. The inner frame projects above the front and side walls of the package body, and provides a seal between the lid and body when the package is closed. Other types of designs of blanks for hinged lid cigarette packages can be of the type described in U.S. Pat. Nos. 3,874,581 to Fox et al, 3,944,066 to Niepmann, and 4,852,734 to Allen et al. However, these packages, primarily due to the circular cross-sectional shape of the cigarettes packaged therein, often have substantially large regions of wasted space (i.e., a large void volume) between individual cigarettes as well as between the cigarettes and the walls of the package.

It would be desirable to provide a cigarette so shaped to reduce the void volume within a package of a plurality of the cigarettes to either reduce the amount of packaging material necessary to package such cigarettes or to permit more cigarettes to be packaged in a conventionally sized package. It would also be desirable to provide cigarettes so shaped to have the same firmness as conventional cigarettes with less tobacco cut filler, while providing individual cigarettes having advantageous aesthetic and consumer perception characteristics.

SUMMARY OF THE INVENTION

The present invention relates to a plurality of manufactured cigarettes adapted to be arranged in a packaged configuration thereof. Each of the cigarettes include a rod of smokable material contained in a circumscribing paper wrapper. Such a rod is referred to herein as a "smokable rod." Each of the smokable rods have a plurality of substantially flat sides or faces. The smokable rods preferably have at least one crease longitudinally extending substantially along the total length thereof. As used herein, the term "crease" relates to a line extending in a substantially straight, predetermined direction, spaced at a predetermined interval or location along the perimeter of the cigarette and formed during the production of the cigarette. Preferably, the crease occurs where adjacent flat sides or faces contact or meet each other to form an edge. A corner is formed where the edges of a plurality of sides or faces meet such as at each end of the smokable rod. Optionally, the cigarette can include a filter element attached to the smokable rod using tipping material. The filter element preferably has substantially the same shape as the smokable rod.

In a preferred embodiment, each of the smokable rods have a pair of opposing side walls and a pair of top and bottom walls when viewed end on. The opposing side walls are in a substantially parallel relationship to each other and the top and bottom walls are in a substantially parallel relationship to each other. As used herein, the term "substantially parallel" relates to at least about 80 percent of the length of the side walls or top and bottom walls being parallel to each other. The remaining length is slightly arcuate (i.e., having a radius of less than 5°, and often less than 3 relative to the inner edge of the corners) to form a slightly rounded corner. As such, the cigarettes of the preferred embodiment have a generally rectangular cross-sectional shape.

The present invention also relates to a method of manufacturing cigarettes adapted to be arranged in the packaged configuration. The method includes providing a plurality of cigarettes including a smokable rod having a substantially circular or oval cross-sectional shape, applying a compressive pressure to the cigarettes to provide a plurality of flat sides thereto, and preferably to provide at least one crease extending longitudinally substantially along the length of the cigarette.

DETAILED DESCRIPTION OF THE PREFERRED EMBODIMENT

Figure 1:
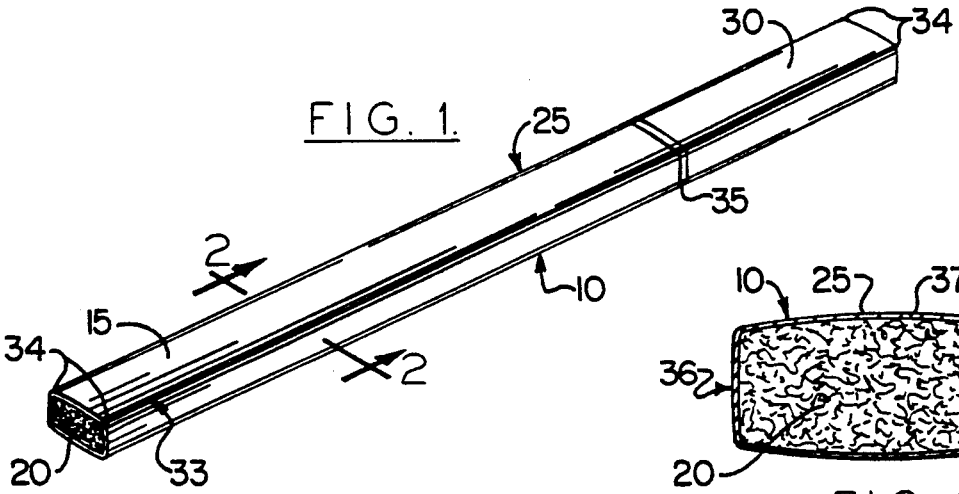
FIG. 1 is a perspective view taken from the open end of a configuration of a cigarette according to the present invention.

One embodiment of a cigarette 10 of the present invention is shown in FIG. 1. The cigarette includes a non-cylindrical, non-circular in cross-sectional shape rod 15 of a charge or roll of smokable filler material 20 contained in circumscribing wrapping material 25. The rod 15 is hereinafter referred to as the "smokable rod." The ends of the smokable rod 15 are open to expose the smokable filler material 20. Typically, the smokable rod 15 has a length which ranges from about 50 mm to about 85 mm, and a perimeter of from about 17 mm to about 28 mm, and often about 22 mm to about 25 mm.

The cigarette 10 normally includes a filter element 30 or other suitable mouthpiece positioned adjacent one end of the smokable rod 15 such that the filter element 30 and smokable rod 15 are axially aligned in an end-to-end relationship, preferably abutting one another. The ends of the filter element 30 are open to permit the passage of air and smoke therethrough. Typically, the filter element has a length which ranges from about 20 mm to about 35 mm and a perimeter of about 17 to 28 mm, and often about 22 mm to about 25 mm.

Each of the smokable rods 15 has a plurality of substantially flat sides or faces (i.e., it is multi-sided) and can have at least one crease 33 longitudinally extending substantially along the total length thereof. The crease 33 occurs where a line extending in a substantially straight, predetermined direction along the perimeter of the smokable rod. Preferably, the crease 33 is where adjacent flat sides or faces contact or meet each other to form an edge. A corner 34 is formed where the edges of a plurality of sides or faces meet such as at each end of the smokable rod 15. The filter element 30 also can have a cross-sectional shape similar to the smokable rod 15 to which it is attached using tipping material 35.

Figure 2:
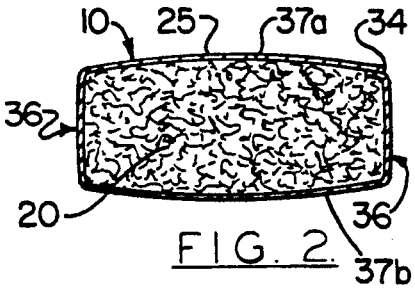
FIG. 2 is a cross-sectional view of the cigarette shown in FIG. 1 taken along the line 2—2 of FIG. 1.

In the embodiment shown in FIGS. 1 and 2, the cigarette 10 has a pair of creases 33 longitudinally extending substantially along the length thereof defining a top face and a pair of creases extending substantially along the total length thereof defining a bottom face with sidewalls therebetween. All of the creases are spaced at predetermined intervals along the length thereof. Such cigarettes have four corners at each end of the smokable rod 15 (i.e., at the open end and the mouth end or filter end) and at each end of the filter element 30 (i.e., the smokable rod end and the extreme mouth end). Such cigarettes have a pair of opposing sidewalls 36 and a pair of top and bottom walls or faces 37*a*, 37*b* respectively when viewed end on, thereby defining a rectangular cross-sectional shape. Typically, the corners 34 have a slightly more than 90° angle, often have a less than 95° angle, and sometimes have a less than 93° angle where the sidewalls meet the top wall or bottom wall. Namely, the creases or edges often can be (and are shown in the figures) slightly curved or arcuate at the corners (i.e., the creases or edges curve outward as measured from an inside edge of the end corners, such curve having a radius of less than 5°, and often less than 3°. The creases individually are substantially straight and are substantially parallel to each other along the length of the smokable rod (i.e., at least about 80 percent of the length of the crease is parallel to the opposing crease). Namely, the opposing sidewalls of faces 36 are in substantially parallel relationship to each other, and the top and bottom walls 37*a*, 37*b* are in a substantially parallel relationship to each other.

Figure 6:
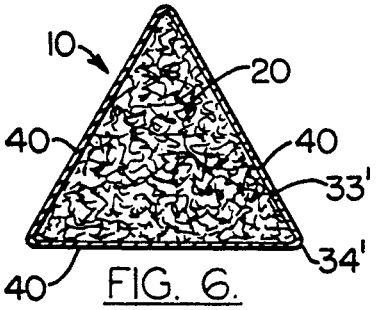
FIG. 6 is a cross-sectional view of an alternative configuration of a cigarette of the present invention.

Alternately the smokable rod 15 can have other shapes which have a plurality of flat sides, a plurality of creases or edges, and three or more corners at each end. For example, as shown in FIG. 6, the smokable rod has three creases 33 or edges and three corners 34 at each end of the smokable rod (i.e., it has three walls 40 to define a triangular cross-sectional shape). Typically, the angles at the corners of the triangular cross-sectioned shaped cigarettes are about 60°. Other cross-sectional shapes such as pentagonal and the like are also contemplated by the present invention.

The thusly shaped non-circular in cross-sectional shape, multi-sided and multi-faced cigarettes utilize less tobacco material (e.g., at least about 20 percent less) relative to a conventional circular cross-sectional shaped cigarette having the same length and perimeter. Thus, a cigarette having the same firmness as a conventional cigarette can be provided using less weight of tobacco material of comparable composition. Moreover, the cigarette of the present invention, having approximately the same length and perimeter as a conventional cigarette, can have greater than about 20 percent less volume, often greater than about 25 percent less volume, often up to about 35 percent less volume, and sometimes up to about 40 percent less volume than conventional cigarettes. The ability to reduce the volume permits the manufacturer to select various cross-sectional areas (and various volumes) by selecting various non-circular cross-sectional shapes (i.e., rectangular, triangular, pentagonal, etc.). Such a non-circular cross-sectional shape is also aesthetically pleasing and permits indicia for identifying the brand and manufacturer to be seen easily. Additionally a cigarette having such a shape has a low tendency to move (e.g., roll) when placed on a sloped or slanted flat surface (e.g., in an ashtray).

The filter material of the filter element 30 can be any suitable material such as cellulose acetate, polypropylene, tobacco material, or the like. Examples of suitable filter materials are described in U.S. Pat. No. 4,998,541 to Perfetti et al. The plug wrap typically is a conventional paper plug wrap, and can be either air permeable or essentially air permeable. However, if desired, a nonwrapped cellulose acetate filter element can be employed. Filter elements having two or more segments, and which are provided using known plug-tube-combining techniques, also can be employed. The filter element 30 preferably has substantially the same cross-sectional shape as the smokable rod 15. The various filter elements suitable for use in this invention can be manufactured using known cigarette filter making techniques and equipment.

The filler material 20 employed in the manufacture of the smokable rod can vary. The preferred filler material is an "American blend" of tobacco materials. For example, the filler can include a blend of flue-cured, Burley, Maryland., Oriental, reconstituted and volume expanded tobaccos. Other suitable blends are described in U.S. Pat. No. 4,998,541 to Perfetti et al and U.S. Pat. No. 4,830,028 to Lawson et al, the disclosure of which are incorporated herein by reference.

The smokable materials generally are employed in the form of cut filler as is common in conventional cigarette manufacture. For example, the smokable filler material can be employed in the form of shreds or strands cut into widths ranging from about 1/20 inch to about 1/60 inch, preferable from about 1/25 inch to about 1/35 inch. Generally, such pieces have lengths which range from about 0.25 inch to about 3 inches.

As used herein, "packing density" when referring to filler material means the weight of the filler material which occupies a unit volume within the smokable rod. For cigarettes of this invention, the packing density generally ranges from about 100 mg/cm$^3$ to about 300 mg/cm$^3$, more typically from about 150 mg/cm$^3$ to about 275 mg/cm$^3$, and typically about 250 mg/cm$^3$. These packing densities can be provided using less tobacco material (i.e., greater than about 25 percent less, often up to about 30 percent less and sometimes up to about 40 percent less) as compared to circular in cross-section shape cigarettes having the same packing densities.

Flavorants can be incorporated into the cigarettes. For example, the filler materials can be employed with casing or top dressing additives. See, for example, Leffingwell et al, *Tobacco Flavoring for Smoking Products* (1972). Flavorants such as menthol can be incorporated into the cigarette using techniques familiar to the skilled artisan.

Typically, the filler material of the smokable rod is circumscribed by a paper wrapper 25 such as described in U.S. Pat. No. 4,998,541 to Perfetti et al as well as U.S. Ser. No. 621,499 filed Dec. 7, 1990 disclosure of which is incorporated herein by reference. Optionally, a double layer of paper wrapper can be used.

A tipping material 35 typically circumscribes the filter element 30 and an adjacent region of the smokable rod 15 such that the tipping material extends about 3 mm to about 6 mm along the length of the smokable rod. Typically, the tipping material is a conventional paper tipping material. The tipping material can have a porosity which can vary. For example, the tipping material can be essentially air impermeable, air permeable, or be treated (e.g., by mechanical or laser perforation techniques) so as to have a region of perforations, openings or vents thereby providing a means for providing air dilution to the cigarette. The total surface area of the perforations and the positioning of the perforations along the periphery of the cigarette can be varied in order to control the performance characteristics of the cigarette.

Figure 3:
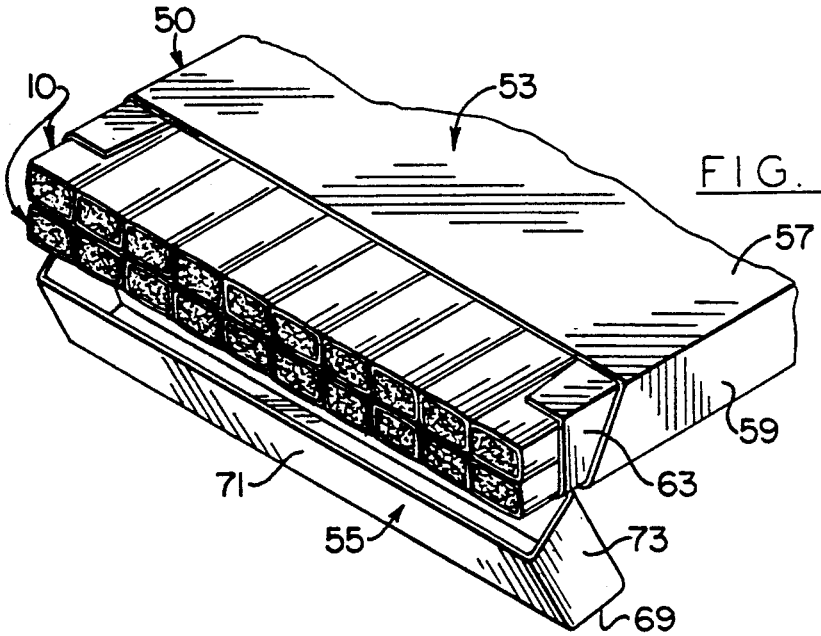
FIG. 3 is a partial perspective view of a package of a plurality of cigarettes of the present invention with the lid thereof in the open position.

A suitable hinged lid package 50 for a plurality of the cigarettes is shown in FIG. 3. Examples of hinged lid packages are set forth in U.S. Pat. Nos. 3,695,422 to Tripodi, 3,874,581 to Fox et al; 3,858,788 to Phillips et al; 3,944,066 to Niepmann; 4,114,777 to Frohling et al; 4,753,383 to Focke et al; and 4,852,734 to Allen et al, and U.K. Patent Application No. 2,059,387, the disclosure of which are incorporated herein by reference. Also, the hinged lid package can have a so-called "princess package" configuration. A preferred package preferably includes a body portion 53 and a lid portion 55. The body portion includes a front wall 57, outer side wall 59, inner side walls (not shown), a rear wall (not shown), and a bottom wall (not shown). The upper edges of the inner and outer side walls of the body of the package can extend from the front of the package to the back thereof at an incline of about 30°, or any other desired angle. Generally, the inner and outer side walls of each side of the body are of similar shape and dimension. An inner liner or collar 63 is glued or otherwise secured to the inner surface of a portion of the front wall 57 and the inner side walls.

The lid portion 55 includes a top portion 69, front wall 71, outer side walls 73 and a rear wall (not shown) which is integrally hinged to the rear wall of the body portion 53. The lower edges of the inner and outer side walls of the lid can extend from the front of the package to the back thereof at an upward incline of about 30°, or any other desired angle. Generally, the inner and outer side walls of each side of the lid are of similar shape and dimension. The package generally includes a clear, colorless sealing film (not shown) such as polypropylene film, or the like. The film is folded and sealed so as to circumscribe (e.g., enclose) the package. Normally, a sealing film, such as an 80 gauge polypropylene film, is heat sealed. A tear tape for slitting the sealing film can be interposed between the cigarette package and the sealing film, in a region adjacent the top of the package.

Figure 8A:
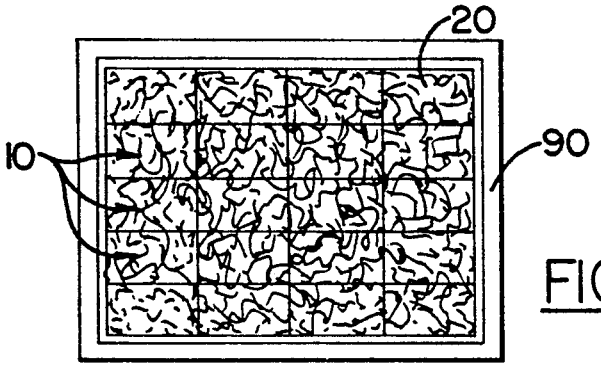
FIG. 8A is a cross-sectional view of a package of a plurality of cigarettes of the present invention arranged in a 4-5 configuration.
Figure 8B:
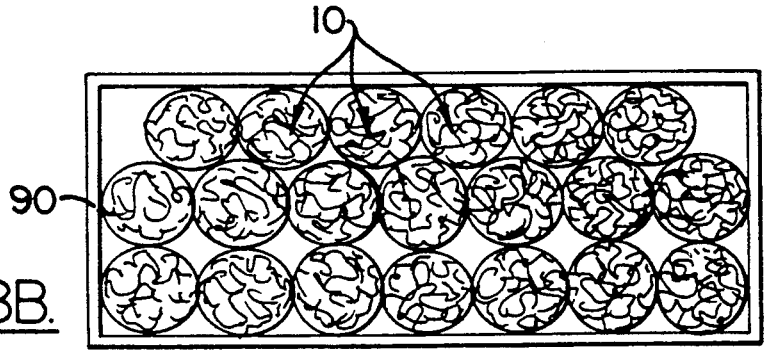
FIG. 8B is a cross-sectional view of a package of a plurality of conventional cigarettes arranged in a typical 7-7-6 configuration.
Figure 8C:
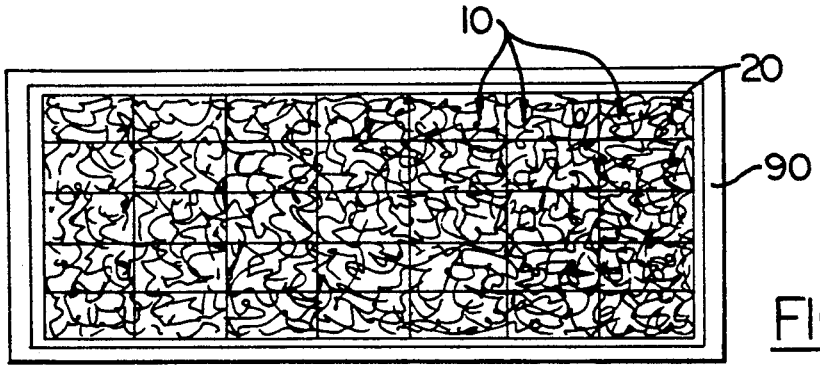
FIG. 8C is a cross-sectional view of a package of a plurality of manufactured cigarettes of the present invention arranged in a 5-7 configuration.

The cigarettes of the present invention can be packaged in various configurations. For example, as shown in FIG. 8A, a 4-5 configuration can be used to package twenty (20) of the manufactured rectangular cross-sectional shape cigarettes 10. As compared to circular in cross-sectional shape cigarettes packaged in a conventional 7-7-6 configuration (shown in FIG. 8B) or in a 10-2 configuration, rectangular in cross-sectional shape cigarettes in the 4-5 configuration utilize substantially less packaging material 90. Moreover, as shown in FIG. 8C, more rectangular cross-sectional shaped cigarettes of the present invention can be packaged in a package having about the same perimeter as one coating conventional cigarettes in a 7-7-6 configuration. Namely, about thirty-five (35) cigarettes of the present invention can be packaged in a conventional package (i.e., one having a perimeter of about 154 mm) which contains twenty (20) conventional cigarettes. Additionally, as shown in FIG. 8A and 8C there is substantially no void volume between cigarettes or between individual cigarettes and the package material, wherein as shown in FIG. 8B, there is a substantial amount of void volume when packaging conventional cigarettes. Moreover, inasmuch as the void volume manufactured in a package of cigarettes of the present invention is substantially zero, deformation of the cigarettes prior to use is avoided. Thus, the cigarettes of the present invention are maintained in their manufactured shape until use by the consumer. During use, the cigarette can be smoked as is by the consumer or he/she can elect to squeeze the end of the smokable rod and/or the filter element to deform the same into a conventional circular cross-sectional shape.

Figure 5:
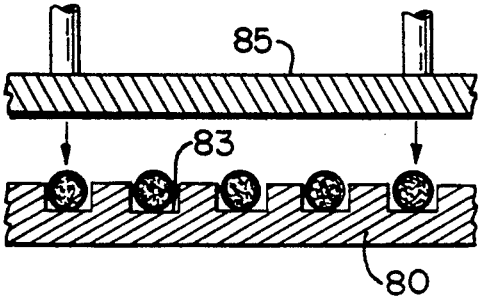
FIG. 5 is a cross-sectional view of a portion of the apparatus for forming a configuration of a cigarette of the present invention.
Figure 4:
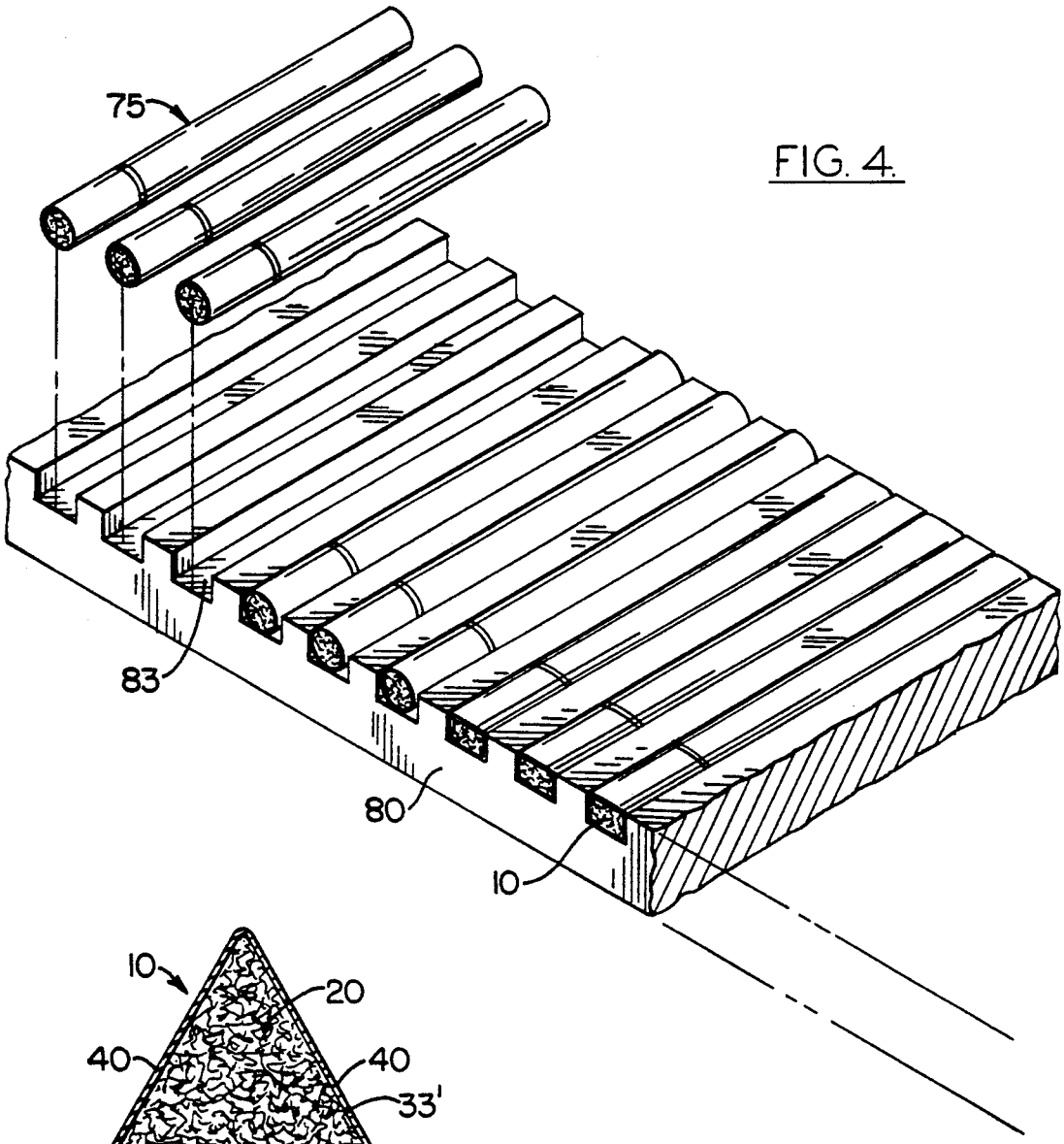
FIG. 4 is a cross-sectional view of a die for forming the cigarettes of the present invention.
Figure 7:
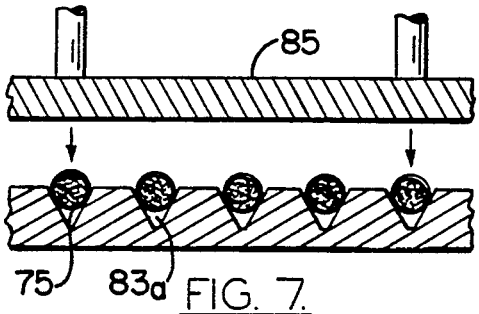
FIG. 7 is a cross-sectional view of a portion of the apparatus for forming the alternative cigarette configuration shown in FIG. 6.

Referring to FIGS. 4 and 5, exemplary means for forming the manufactured cigarettes of the present invention are shown. In operation, cylindrical cigarettes having a circular cross-section (see U.S. Pat. No. 4,638,818 to Nichols et al) are made using a conventional cigarette making apparatus such as a Hauni Protos Cigarette Maker from Hauni-Werke Korber & Co., KG. Filter elements are manufactured and attached to the cigarettes using known techniques. The circular in cross-sectional shape cigarettes 75 are then placed, preferably soon after manufacture, in a die 80 or other means for forming the cigarette. The die 80 preferably has slots 83 or other means for shaping the cigarette into the desired cross-sectional shape such as the rectangular in cross-sectional shape cigarettes shown in FIG. 4. The slot is so sized that a portion of the cigarette extends above and outside of the slots 83 and the cross-sectional shape of the cigarettes is determined by the contours of the die 80. A platen 85 or other means for providing a compressive pressure is then used to apply a compressive pressure to the exposed surfaces of the cigarettes. In an alternative embodiment (see FIG. 7), a die 80*a* having triangular slots 83*a* can be used to form smokable rods having a triangular in cross-sectional shape as shown in FIG. 6. Other methods of forming the non-circular in cross-sectional shape cigarettes will be readily apparent to those skilled in the art.

The following example is provided in order to further illustrate the invention but should not be construed as limiting the scope thereof.

EXAMPLE

Circular in cross-sectional shaped cigarettes having a length of about 98 mm and a perimeter (circumference) of 24 mm have smokable rod lengths of about 74 mm and filter element lengths of about 24 mm. The smokable rod includes a charge of tobacco cut filler contained in a single layer of circumscribing cigarette paper wrap. The packing density of the cut filler within the smokable rod is about 185 mg/cm$^3$. The filter element includes plasticized cellulose acetate low circumscribed by plug wrap and attached to the smokable rod using tipping paper.

The cigarettes are placed in a die 83 as shown in FIGS. 4 and 5. A compressive pressure of about 1 psi using the platen 85 is applied to the cigarettes to form manufactured cigarettes having a rectangular cross-sectional shape and still having a perimeter of about 24 mm. The length of the cigarette is about 98 mm. The cigarettes have a cross-sectional height of about 4.5 mm and a cross-sectional width of about 7.5 mm. The manufactured cigarette has an essentially rectangular cross-sectional shape, and although each of the four sides exhibit a slight outward curvature (as shown in FIG. 2), the opposite sides of the cigarette are essentially parallel to one another. The packing density of the so shaped manufactured cigarette is about 250 mg/cm$^3$. As such the rectangular cross-sectional in shape cigarette has a packing density of about 35 percent more than that of a conventional cigarette having a conventional circular cross-sectional shape.

The so shaped manufactured cigarettes having a rectangular cross-section are arranged in a 4-5 package (20 cigarettes) configuration having a perimeter of about 111 mm as shown in FIG. 8A and in a 5-7 (35 cigarettes) configuration having a perimeter of about 154 mm as shown in FIG. 8C. Either configuration have insignificant void volumes, and the void volumes are substantially zero. Twenty of the circular cross-sectional shape cigarettes of circumference equal do not fit in the package cigarette having the 111 mm perimeter without substantial undesirable deformation. For smoking, the cigarette is removed and smoked in a conventional manner with the extreme filter element being inserted into the mouth of the consumer, or the extreme mouth end of the filter element can be squeezed by the consumer with his/her fingers to deform the filter element into a conventional circular cross-sectional shape for smoking.

That which is claimed is:

1. A plurality of manufactured cigarettes adapted to be arranged in a packaged configuration thereof, each of said cigarettes including a smokable rod and each of said smokable rods having a plurality of substantially flat sides and having at least one crease longitudinally extending substantially along the total length thereof.

2. A plurality of manufactured cigarettes according to claim 1 wherein said cigarettes have a substantially triangular cross-sectional shape.

3. A package of the plurality of manufactured cigarettes according to claim 1.

4. A plurality of manufactured cigarettes according to claim 1 wherein said cigarettes are packaged in a 5-7 configuration and have a void volume of substantially zero.

5. A plurality of manufactured cigarettes according to claim 1 wherein said smokable rods include a pair of creases longitudinally extending substantially along the total length thereof, the pair of creases defining one of said flat sides.

6. A plurality of manufactured cigarettes according to claim 1 or 2 wherein said smokable rods have a substantially rectangular cross-sectional shape.

7. A plurality of manufactured cigarettes according to claim 6 wherein said cigarettes are packaged in a 10-2 configuration and have a void volume of substantially zero.

8. A plurality of manufactured cigarettes according to claim 6 wherein said cigarettes are packaged in a 4-5 configuration and have a void volume of substantially zero.

9. A plurality of manufactured cigarettes according to claim 6 wherein said cigarettes are packaged in a 5-7 configuration and have a void volume of substantially zero.

10. A plurality of manufactured cigarettes according to claim 6 wherein each of said cigarettes includes a filter element having substantially the same shape as the smokable rod.

11. A plurality of manufactured cigarettes according to claim 6 wherein each cigarette rod have a packing density of from about 100 mg/cm$^3$ to about 300 mg/cm$^3$, a length of about 50 mm to about 85 mm and a perimeter of about 17 mm to about 28 mm; wherein each smokable rod utilizes up to about 40 percent less smokable material relative to a conventional smokable rod have a circular cross-sectional shape, and having a smokable rod having a length and perimeter substantially the same as said smokable rod having a substantially rectangular cross-sectional shape.

12. A plurality of manufactured cigarettes adapted to be arranged in a packaged configuration thereof, said cigarettes including a smokable rod and each of said smokable rods having a pair of opposing side walls and a pair of top and bottom walls when viewed end on, wherein the opposing side walls are in a substantially parallel relationship to each other, and the top and bottom walls are in a substantially parallel relationship to each other wherein said smokable rod includes a pair of creases longitudinally extending substantially along the total length of the smokable rod, the pair of creases defining at least one flat side.

13. A plurality of manufactured cigarettes according to claim 12 wherein said cigarettes are packaged in a 10-2 configuration and have a void volume of substantially zero.

14. A plurality of manufactured cigarettes according to claim 12 wherein said cigarettes are packaged in a 4-5 configuration and have a void volume of substantially zero.

15. A plurality of manufactured cigarettes of claim 12 each of said cigarettes including a filter element having substantially the same shape as the smokable rod.

16. A plurality of manufactured cigarettes according to claim 12 wherein each cigarette rod have a packing density of from about 100 mg/cm$^3$ to about 300 mg/cm$^3$, a length of about 50 mm to about 85 mm and a perimeter of about 17 mm to about 28 mm wherein each smokable rod utilizes up to about 40 percent less smokable material relative to a conventional smokable rod have a circular cross-sectional shape, and having a smokable rod having a length and perimeter substantially the same as said smokable rod having a substantially rectangular cross-sectional shape.

17. A package of the plurality of manufactured cigarettes according to claim 12.

18. A method of manufacturing cigarettes adapted to be arranged in a packaged configuration thereof, said method comprising:

(a) providing a plurality of cigarettes including a smokable rod having a substantially circular cross-sectional shape and (b) applying a compressive pressure to the smokable rods of step (a) having a substantially circular cross-sectional shape to provide a plurality of flat sides and at least one crease in the smokable rod.

19. A method according to claim 18 whereby the smokable rods provided in step (b) have one crease.

20. A method according to claim 18 whereby the cigarettes provided in step (b) have a substantially rectangular cross-sectional shape.

21. A method according to claim 18 whereby the cigarettes provided in step (b) have two creases.

22. A method according to claim 18 whereby the cigarettes provided in step (b) have a substantially triangular cross-sectional shape.

* * * * *